（12）United States Patent  
Yasuda et al.

(10) Patent No.: US 9,030,579 B2  
(45) Date of Patent: May 12, 2015

(54) IMAGE PROCESSING APPARATUS AND CONTROL METHOD THAT CORRECTS A SIGNAL LEVEL OF A DEFECTIVE PIXEL

(75) Inventors: Takayuki Yasuda, Yokohama (JP); Hiroshi Ogino, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/131,377

(22) PCT Filed: Aug. 7, 2012

(86) PCT No.: PCT/JP2012/070586  
§ 371 (c)(1),  
(2), (4) Date: Jan. 7, 2014

(87) PCT Pub. No.: WO2013/022113  
PCT Pub. Date: Feb. 14, 2013

(65) Prior Publication Data  
US 2014/0125847 A1   May 8, 2014

(30) Foreign Application Priority Data

Aug. 9, 2011   (JP) .................................. 2011-174252  
Jun. 21, 2012   (JP) .................................. 2012-140037

(51) Int. Cl.  
*H04N 5/367* (2011.01)  
*H04N 9/04* (2006.01)

(52) U.S. Cl.  
CPC ............... *H04N 5/367* (2013.01); *H04N 9/045* (2013.01); *H04N 2209/045* (2013.01)

(58) Field of Classification Search  
CPC ........................................................ H04N 5/367  
USPC .......................................................... 348/246  
See application file for complete search history.

(56) References Cited

U.S. PATENT DOCUMENTS

| | | | |
|---|---|---|---|
| 7,034,539 B2 | 4/2006 | Ueda et al. | |
| 7,477,781 B1 | 1/2009 | Tanbakuchi | |
| 8,654,220 B2* | 2/2014 | Honda et al. | 348/246 |
| 2003/0063203 A1 | 4/2003 | Ohno | |
| 2012/0070081 A1* | 3/2012 | Lukac | 382/167 |
| 2014/0063297 A1* | 3/2014 | Yamura | 348/242 |

FOREIGN PATENT DOCUMENTS

| | | | |
|---|---|---|---|
| JP | 2008-263521 A | 10/2008 | |
| WO | 2007/106898 A1 | 9/2007 | |

* cited by examiner

*Primary Examiner* — Gary C Vieaux  
(74) *Attorney, Agent, or Firm* — Fitzpatrick, Cella, Harper & Scinto

(57) ABSTRACT

A direction being across the defective pixel and along which pixels used to calculate a signal level of a defective pixel are located, is determined. A ratio between signal levels of pixels that are adjacent to the defective pixel and that have a different color from the defective pixel, and signal levels of pixels that are adjacent to pixels being located along the determine direction with respect to the defective pixel and having the same color as the defective pixel and that have a different color from the defective pixel, is acquired. A value obtained by multiplying an average value of the signal levels of the pixels used to calculate the signal level of the defective pixel by the calculated ratio is output as the signal level of the defective pixel.

8 Claims, 7 Drawing Sheets

FIG. 3A

| B | G0 | B | G1 | B | G2 | B |
|---|----|---|----|---|----|---|
| G3 | R0 | G4 | R1 | G5 | R2 | G6 |
| B | G7 | B | G8 | B | G9 | B |
| G10 | R3 | G11 | R4 | G12 | R5 | G13 |
| B | G14 | B | G15 | B | G16 | B |
| G17 | R6 | G18 | R7 | G19 | R8 | G20 |
| B | G21 | B | G22 | B | G23 | B |

AVERAGE VALUE OF
G PIXELS ADJACENT TO R2
(G_AVE1) = (G2 + G5 + G6 + G9)/4

AVERAGE VALUE OF
G PIXELS ADJACENT TO R4
(DEFECTIVE PIXEL 800)
(G_AVE0) = (G8 + G11 + G12 + G15)/4

AVERAGE VALUE OF
G PIXELS ADJACENT TO R6
(G_AVE2) = (G14 + G18 + G17 + G21)/4

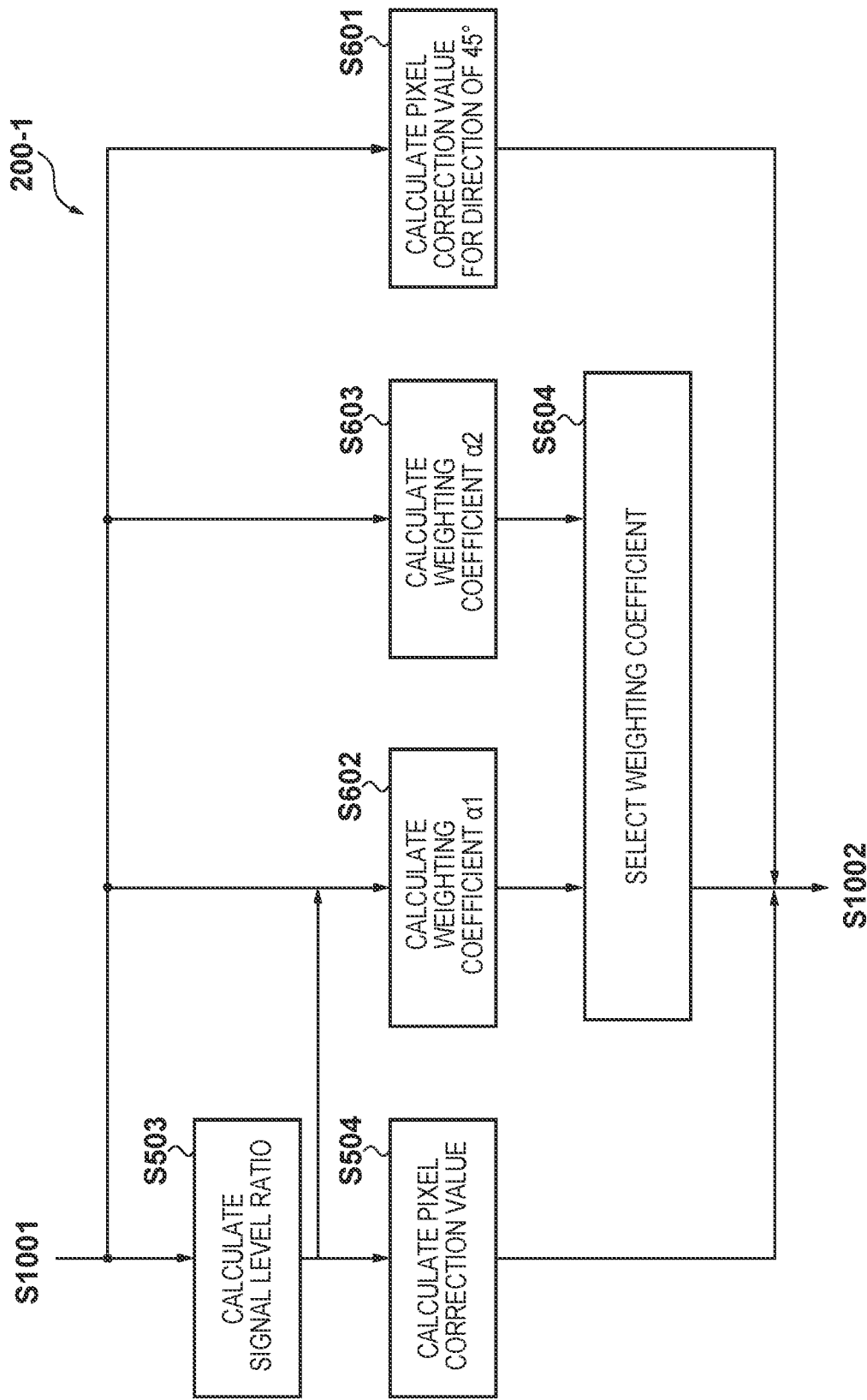

IMAGE PROCESSING APPARATUS AND CONTROL METHOD THAT CORRECTS A SIGNAL LEVEL OF A DEFECTIVE PIXEL

TECHNICAL FIELD

The present invention relates to an image processing apparatus and a control method therefore, and in particular to an image processing apparatus that processes captured images and a control method therefore.

BACKGROUND ART

Conventional imaging devices such as digital cameras and video cameras generally use solid-state image sensors such as CCD image sensors and CMOS image sensors. Solid-state image sensors may include defective pixels that occur in a manufacturing process. Such defective pixels are one of the causes of the decreased quality of captured images and the decreased fabrication yield of the solid-state image sensors.

In order to suppress a decrease in the image quality caused by defective pixels, it has been suggested to complement pixel signals corresponding to the defective pixels using pixel signals of other normal pixels. Japanese Patent Laid-Open No. 2008-263521 suggests a method whereby a pair of pixels is selected from among pairs of pixels, each pair of pixels being located so as to sandwich the defective pixel and are adjacent to the defective pixel along the four directions of 0°, 45°, 90°, and 135° in accordance with the ratio between outputs of the pixels, and an average value of the pixel signals of the selected pair is used as an output signal of the defective pixel.

However, with the method of Japanese Patent Laid-Open No. 2008-263521 whereby the defective pixel is corrected using the pair of pixels selected from among the pairs of pixels, each pair of pixels being located so as to sandwich the defective pixel along the four directions of 0°, 45°, 90°, and 135°, there are cases where the accuracy of the pixel correction value acquired through the complementing process is not necessarily sufficient.

SUMMARY OF INVENTION

The present invention has been conceived in view of the aforementioned problem accompanying the conventional technologies, and provides an image processing apparatus that can achieve further improvement in the accuracy of a pixel correction value for correcting a defective pixel, and a control method for the image processing apparatus.

According to one aspect of the present invention, there is provided an image processing apparatus that corrects a signal level of a defective pixel included in image data captured by an image sensor provided with a color filter where a plurality of certain colors are regularly arranged, the image processing apparatus comprising: determination means for, based on differences in signal levels of a plurality of pairs of pixels, each pair of pixels being located so as to sandwich the defective pixel and have the same color as the defective pixel, determining a direction being across the defective pixel and along which pixels used to calculate the signal level of the defective pixel are located; ratio calculation means for calculating a ratio between signal levels of pixels that are adjacent to the defective pixel and that have a different color from the defective pixel, and signal levels of pixels that are adjacent to pixels being located along the direction determined by the determination means with respect to the defective pixel and having the same color as the defective pixel and that have a different color from the defective pixel; and first correction processing means for outputting, as the signal level of the defective pixel, a value obtained by multiplying an average value of signal levels of the pixels being located along the direction determined by the determination means with respect to the defective pixel and having the same color as the defective pixel, by the ratio calculated by the ratio calculation means.

According to another aspect of the present invention, there is provided a control method for an image processing apparatus that corrects a signal level of a defective pixel of an image sensor provided with color filters where a plurality of certain colors are regularly arranged, the defective pixel being included in image data captured by the image sensor, the control method comprising: a determination step of, based on differences in signal levels of a plurality of pairs of pixels, each pair of pixels being located so as to sandwich the defective pixel and have the same color as the defective pixel, determining a direction being across the defective pixel and along which pixels used to calculate the signal level of the defective pixel are located; a ratio calculation step of calculating a ratio between signal levels of pixels that are adjacent to the defective pixel and that have a different color from the defective pixel, and signal levels of pixels that are adjacent to pixels being located along the direction determined in the determination step with respect to the defective pixel and having the same color as the defective pixel and that have a different color from the defective pixel; and a first correction processing step of outputting, as the signal level of the defective pixel, a value obtained by multiplying an average value of signal levels of the pixels being located along the direction determined in the determination step with respect to the defective pixel and having the same color as the defective pixel, by the ratio calculated in the ratio calculation step.

Further features of the present invention will become apparent from the following description of exemplary embodiments with reference to the attached drawings.

BRIEF DESCRIPTION OF DRAWINGS

FIG. 3A is a diagram for explaining examples of pixel arrangement and a direction determination unit.

FIG. 3B is a diagram for explaining the operations of a level ratio calculation unit.

FIG. 7 is a flowchart for explaining the details of processing for calculating pixel correction values in S1001 of FIG. 6.

DESCRIPTION OF EMBODIMENTS

Preferred embodiments of the present invention will now be described in detail in accordance with the accompanying drawings.

(First Embodiment)

Figure 1:
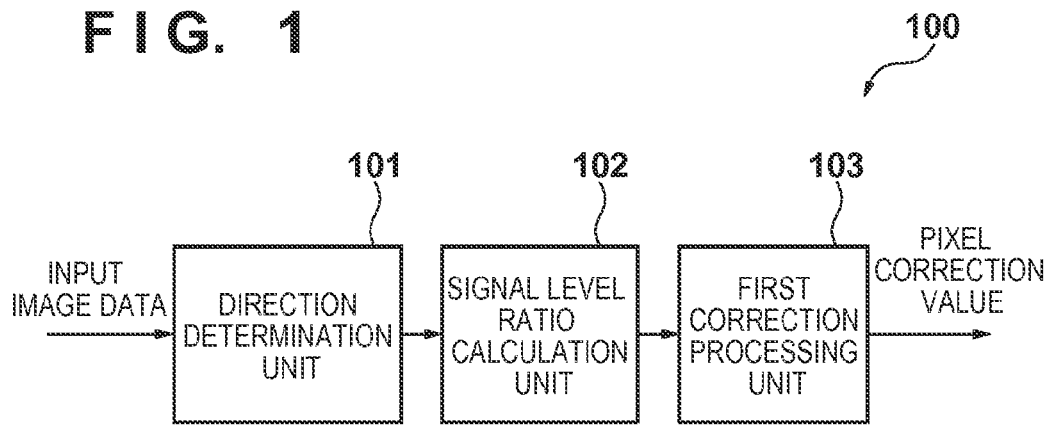
FIG. 1 is a block diagram schematically showing an example of the functional configuration of an image processing apparatus pertaining to First Embodiment of the present invention.

FIG. 1 is a block diagram schematically showing an example of the functional configuration of an image processing apparatus pertaining to First Embodiment of the present invention. It should be noted here that the functional blocks shown in FIG. 1 may be realized by a computer executing software, or by hardware logic. The image processing apparatus may be embodied by, for example, a central processing unit (CPU) controlling hardware (e.g. a storage device and an interface) of a general-purpose computer through execution of a control program.

The following description is given under the precondition that an image processing apparatus 100 can determine pixel data corresponding to a defective pixel from among a plurality of pixel data constituting the input image data. For instance, the image processing apparatus 100 may be provided in advance with information relating to coordinates of the defective pixel of an image sensor that captured the input image data. Alternatively, the image processing apparatus 100 may obtain position information of the defective pixel that is included in the input image data as supplemental information.

In the present embodiment, the input image data has been captured using an image sensor provided with a primary-color Bayer filter. The primary-color Bayer filter is a mosaic of red (R), green (G) and blue (B) filters that are arranged such that two same-colored filters neighbor each other with one pixel of a different color therebetween, in both vertical and horizontal directions.

A direction determination unit 101 determines the direction being across the defective pixel and along which the pixels used to calculate the signal level of the defective pixel are located, based on differences in signal levels of a plurality of pairs of pixels, each pair of pixels being located so as to sandwich the defective pixel and have the same color as the defective pixel.

A signal level ratio calculation unit 102 acquires a ratio between the following:
signal levels of pixels that are adjacent to the defective pixel and have a different color from the defective pixel, and
signal levels of pixels that are adjacent to pixels being located at the periphery of the defective pixel and having the same color as the defective pixel, and that have a different color from the defective pixel.

A first correction processing unit 103 calculates pixel correction data, which serves as a signal level of the defective pixel, by multiplying an average value of the signal levels of the pixels being located at the periphery of the defective pixel and having the same color as the defective pixel by the ratio calculated by the signal level ratio calculation unit 102.

Figure 2:
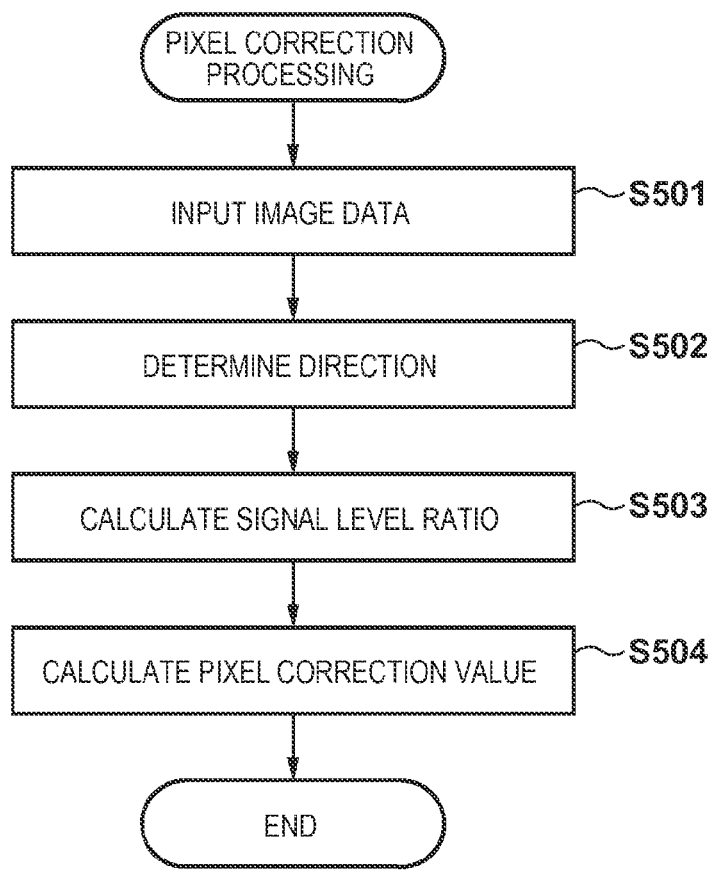
FIG. 2 is a flowchart for explaining the operations of the image processing apparatus shown in FIG. 1.

The following is a more specific description of the details of the operations of the units shown in FIG. 1 with reference to the flowchart of FIG. 2. Note that the following description is given under the assumption that image data having the color arrangement shown in FIG. 3A is input, and the red pixel R4 is the defective pixel 800. In FIG. 3A, B denotes blue pixels, and G0 to G23 denote green pixels. In practice, it is usually the case that a similar pixel arrangement is made in a repeated manner. However, FIG. 3A only shows a part of the image data that includes pixels located at the periphery of the defective pixel so as to facilitate the understanding and explanation of the present invention.

First, the image processing apparatus 100 receives an input of image data in which red pixels, blue pixels and green pixels are arrayed in accordance with the Bayer arrangement (S501). Here, the image data may be input from a removable recording medium such as a semiconductor memory card, or via a network. Alternatively, in the case where the image processing apparatus pertaining to the present embodiment is built in an imaging device, the input image data may have been captured by the imaging device.

The direction determination unit 101 obtains, from the input image data, the signal levels of pixels R0, R1, R2, R3, R5, R6, R7 and R8 that are located at the periphery of the defective pixel 800 and have the same color as the defective pixel 800. Here, "the pixels that are located at the 'periphery' of the defective pixel and have the same color as the defective pixel" denotes the pixels that are adjacent to the defective pixel along the directions across the defective pixel, such as the horizontal direction (0°), the vertical direction (90°), the direction of 45° and the direction of 135°, and have the same color as the defective pixel, with the defective pixel being the center of these pixels.

The direction determination unit 101 then acquires, for each direction, the absolute value of a difference between the adjacent pixels. More specifically, the direction determination unit 101 acquires the absolute value |R0−R8| of a difference between pixels R0 and R8, the absolute value |R1−R7| of a difference between pixels R1 and R7, the absolute value |R2−R6| of a difference between pixels R2 and R6, and the absolute value |R3−R5| of a difference between pixels R3 and R5.

The direction determination unit 101 determines the direction along which a pair of adjacent pixels whose difference has the smallest absolute value is located as a determined direction 801. In the example of FIG. 3A, the absolute value |R2−R6| of the difference between pixels R2 and R6 is the smallest, and therefore 45° is obtained as the determined direction. The direction determination unit 101 outputs determined direction information indicating the determined direction 801 (S502).

It should be noted that the above-described determination of the direction along which the pixels used to complement the defective pixel are extracted (direction determination) may be made using other method.

Next, the signal level ratio calculation unit 102 extracts the signal levels of pixels R2 and R6 from among the pixels that are located at the periphery of the defective pixel and have the same color as the defective pixel, the pixels R2 and R6 being located along the direction (45°) indicated by the determined direction information obtained from the direction determination unit 101.

Thereafter, as shown in FIG. 3B, the signal level ratio calculation unit 102 extracts the signal levels of:
green pixels G8, G11, G12 and G15, which are pixels that are adjacent to the defective pixel 800 and have a different color from the defective pixel 800,
green pixels G2, G5, G6 and G9, which are pixels that are adjacent to pixel R2 and have a different color from pixel R2, and
green pixels G14, G17, G18 and G21, which are pixels that are adjacent to pixel R6 and have a different color from pixel R6.

Here, the pixels in the three areas whose signal levels are extracted have the same color. Alternatively, instead of the aforementioned green pixels, the blue pixels that are located diagonally to the defective pixel, pixel R2 and pixel R6 may be extracted as the pixels that are adjacent to and have a different color from these red pixels. In the case where the defective pixel is a blue pixel, processing can be executed in a similar manner as in the case where the defective pixel is a red pixel. In the case where the defective pixel is a green pixel, the pixels that are adjacent to the defective pixel and have a different color from the defective pixel are constituted by two blue pixels and two red pixels. In this case, the signal levels of the pixels of both colors may be extracted, or the signal levels of the pixels of one of the two colors may be extracted. For example, in the case where the defective pixel is a green pixel, the signal level ratio calculation unit 102 may calculate the signal level ratio from the following expressions by using the two red pixels vertically adjacent to the green pixel and the two blue pixels horizontally adjacent to the green pixel in all of the three areas.

The signal level ratio calculation unit 102 calculates the signal level ratio in accordance with the following Expressions 1 through 4 (S503).

An average value G_AVE0 of the green pixels adjacent to the defective pixel 800 (R4) (first average value):

$$G\_AVE0 = (G8+G11+G12+G15)/4 \quad \text{[Expression 1]}$$

An average value G_AVE1 of the green pixels adjacent to pixel R6 (second average value):

$$G\_AVE1 = (G14+G18+G17+G21)/4 \quad \text{[Expression 2]}$$

An average value G_AVE2 of the green pixels adjacent to pixel R2 (third average value):

$$G\_AVE2 = (G2+G5+G6+G9)/4 \quad \text{[Expression 3]}$$

$$\text{Signal level ratio} = (G\_AVE0/((G\_AVE1+G\_AVE2)/2)) \quad \text{[Expression 4]}$$

Next, the first correction processing unit 103 extracts the signal levels of pixels R2 and R6 from among the pixels that are located at the periphery of the defective pixel and have the same color as the defective pixel, the pixels R2 and R6 being located along the direction (45°) indicated by the determined direction information obtained from the direction determination unit 101. Thereafter, the first correction processing unit 103 calculates a pixel correction value that serves as the signal level of the defective pixel in accordance with the following Expression 5 with the use of the signal level ratio acquired by the signal level ratio calculation unit 102 in accordance with Expression 4 (S504).

$$\text{Correction value for defective pixel } 800 = ((R2+R6)/2) \times (G\_AVE0/(G\_AVE1+G\_AVE2)/2) \quad \text{[Expression 5]}$$

As set forth above, in the case where the signal level of the defective pixel is complemented using the signal levels of pixels located at the periphery of the defective pixel, the present embodiment determines a certain direction along which the pixels to be used for the complementing process are located based on the signal levels of the pairs of pixels that are located at the periphery of the defective pixel and have the same color as the defective pixel. The certain direction is selected from among a plurality of directions determined by the arrangement of a color filter. In the case of the Bayer arrangement, the certain direction is one of 0°, 45°, 90°, and 135°.

Furthermore, the present embodiment acquires a ratio between the average value of the signal levels of pixels that are adjacent to the defective pixel and have a different color from the defective pixel, and the average value of the signal levels of pixels that are adjacent to pixels used for complementing the defective pixel and have a different color from the defective pixel. The pixel correction value is corrected using the acquired ratio. This correction makes it possible to obtain the pixel correction value with which a shift in the aforementioned certain direction and in the direction of color edges of the subject has been corrected, and therefore to improve the accuracy of the pixel correction value.

The above description is for the case where the pixels involved in calculation of the correction value for the defective pixel are all indefective pixels. However, if a defective pixel is included among the pixels whose signal levels are to be extracted, the included defective pixel may not be used, or alternatively, another pixel that is second-adjacent to the defective pixel targeted for correction may instead be used (provided that the included defective pixel is first-adjacent to the defective pixel targeted for correction). For example, in the example of FIG. 3A, if the pixel R2 is a defective pixel, the direction of 45° may not be used as the determined direction, or alternatively, the direction of 45° may be used as the determined direction with the use of the value of the second-adjacent pixel (provided that the pixel R2 is the first-adjacent pixel), namely a red pixel that is not shown in FIG. 3A and is two pixels away from the pixel R2 along the direction of 45°.

(Second Embodiment)

A description is now given of Second Embodiment of the present invention.

Figure 4:
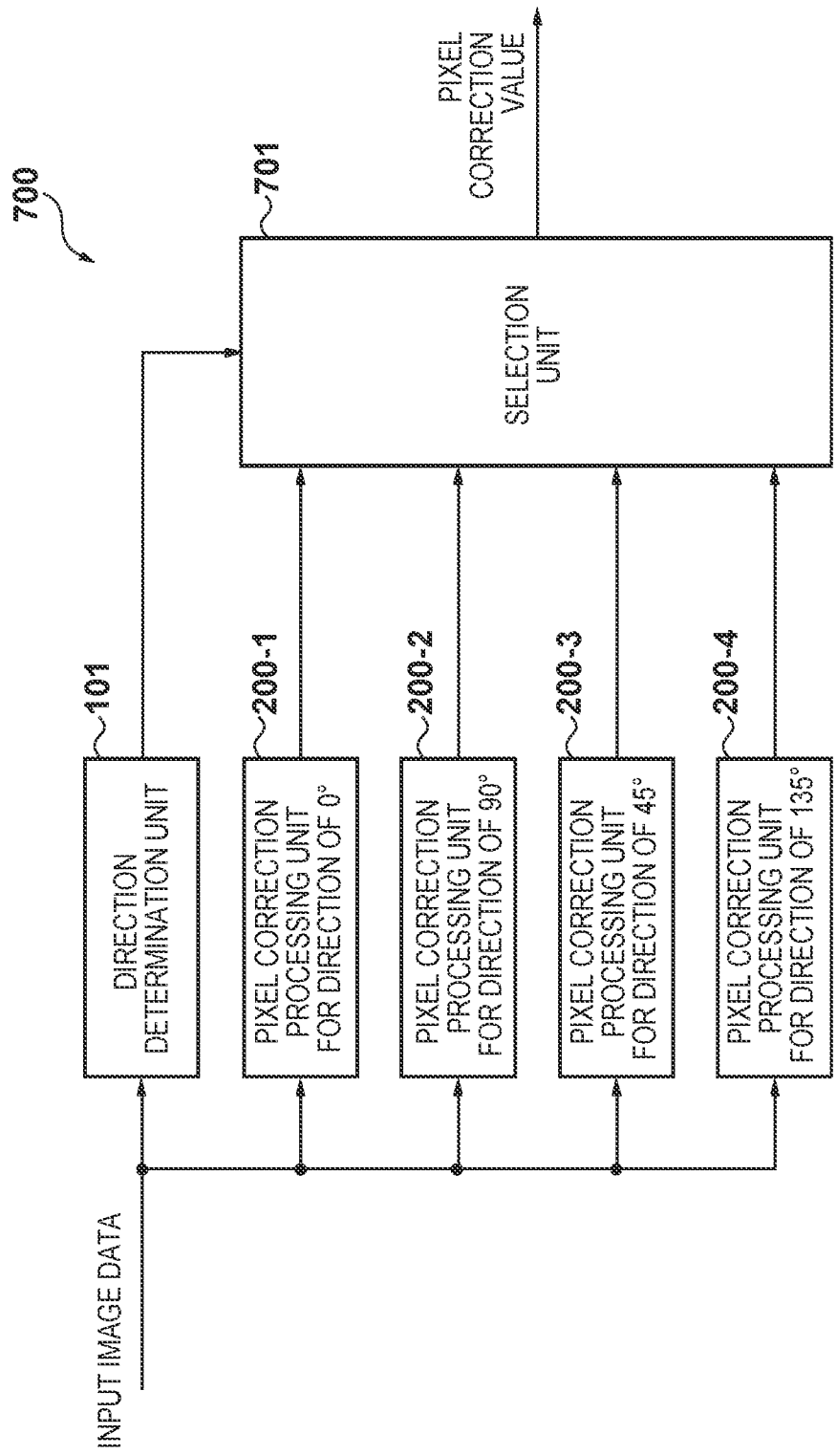
FIG. 4 is a block diagram schematically showing an example of the functional configuration of an image processing apparatus pertaining to Second Embodiment of the present invention.
Figure 5:
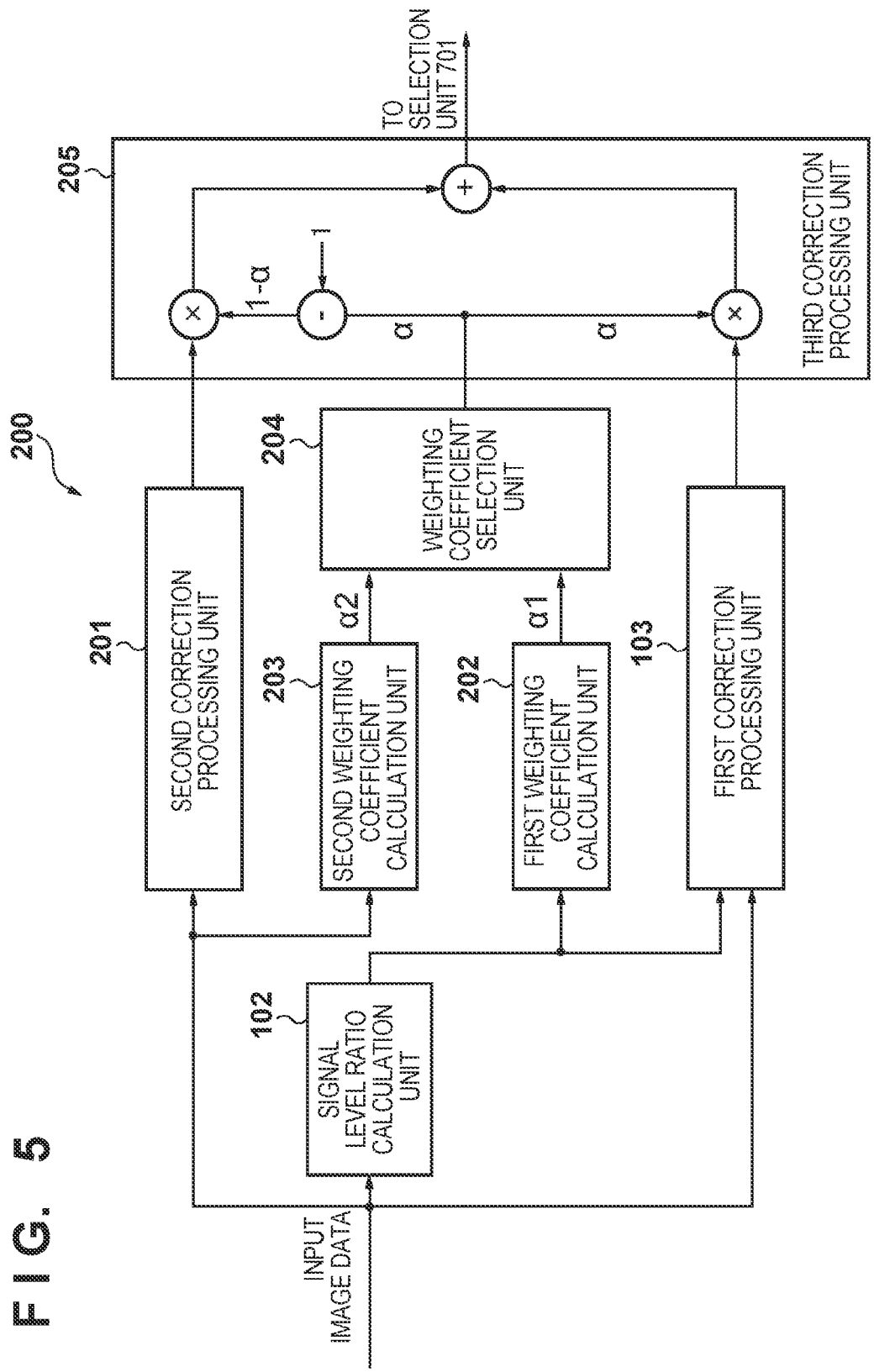
FIG. 5 is a block diagram schematically showing an example of the functional configuration of a pixel correction processing unit shown in FIG. 4.

FIG. 4 is a block diagram schematically showing an example of the functional configuration of an image processing apparatus pertaining to the present embodiment. FIG. 5 is a block diagram showing an example of the functional configuration of pixel correction processing units 200-1 to 200-4 corresponding to the directions of 0°, 45°, 90°, and 135° shown in FIG. 4. As the pixel correction processing units 200-1 to 200-4 may be configured in the same way, the reference sign 200 in FIG. 5 may denote any one of them.

In FIG. 4, a direction determination unit 101 is the same as the one explained in First Embodiment. The pixel correction processing units 200-1 to 200-4 respectively calculate pixel correction values corresponding to the directions of 0°, 45°, 90°, and 135°. A selection unit 701 selects one of the pixel correction values from the pixel correction processing units 200-1 to 200-4 based on the result output from the direction determination unit 101, and outputs the selected value as the final pixel correction value.

In FIG. 5, a signal level ratio calculation unit 102 and a first correction processing unit 103 are configured in a similar manner as those explained in First Embodiment. A second correction processing unit 201 calculates, as pixel correction data, an average value of the signal levels of pixels that are located at the periphery of the defective pixel and have the same color as the defective pixel. Furthermore, a first weighting coefficient calculation unit 202, a second weighting coefficient calculation unit 203 and a weighting coefficient selection unit 204, as a whole, calculate a weighting coefficient used to perform weighted addition on the values output from the first correction processing unit 103 and the second correction processing unit 201.

The first weighting coefficient calculation unit 202 calculates a weighting coefficient $\alpha 1$ for the correction value obtained from the second correction processing unit 201 and the correction value obtained from the first correction processing unit 103.

The second weighting coefficient calculation unit 203 calculates a weighting coefficient $\alpha 2$ for the correction value obtained from the second correction processing unit 201 and the correction value obtained from the first correction processing unit 103.

The weighting coefficient selection unit 204 selects one of the weighting coefficients $\alpha 1$ and $\alpha 2$ and outputs the selected coefficient as a weighting coefficient $\alpha$.

A third correction processing unit 205 calculates the pixel correction data for the defective pixel by performing, with the use of the weighting coefficient $\alpha$ output from the weighting coefficient selection unit 204, weighted addition on the weighting coefficients of the correction value obtained from the first correction processing unit 103 and the correction value obtained from the second correction processing unit 201.

Figure 6:
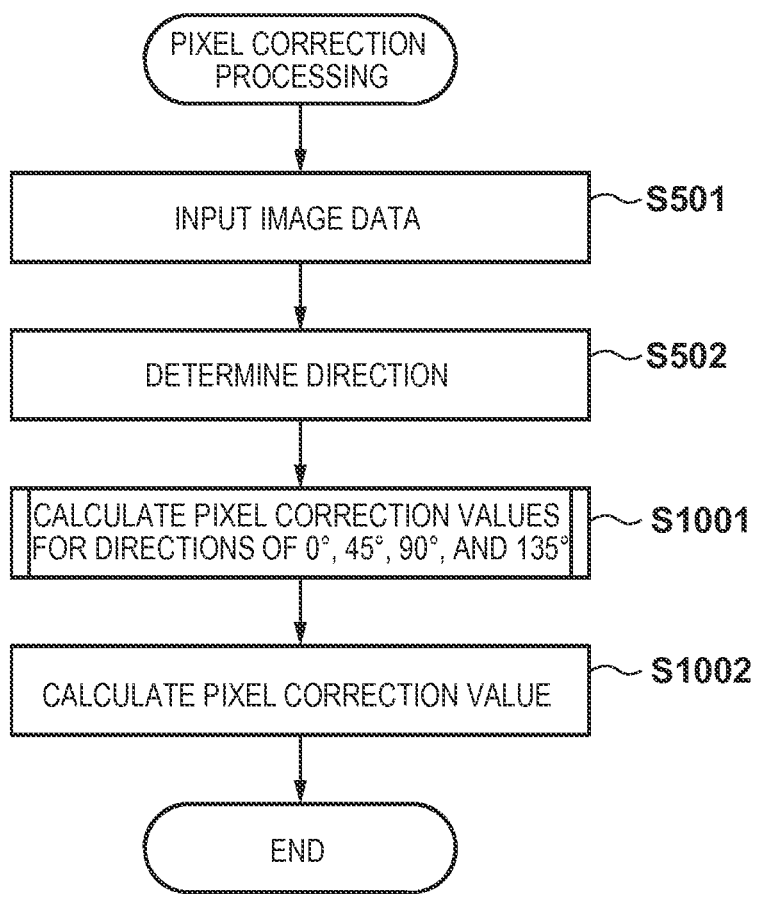
FIG. 6 is a flowchart for explaining the operations of the image processing apparatus shown in FIG. 4.

The following is a more specific description of the details of the operations of the units shown in FIG. 4 with reference to the flowchart of FIG. 6. Note that S501 and S502 are similar to those explained in First Embodiment, and therefore a description thereof is omitted.

The correction processing units 200-1 to 200-4 respectively calculate the pixel correction values corresponding to the directions of 0°, 45°, 90° and 135°, and input the calculated pixel correction values to the selection unit 701 (S1001).

The selection unit 701 selects, from among the pixel correction values corresponding to the directions of 0°, 45°, 90°, and 135°, the pixel correction value corresponding to the determined direction obtained in S502, and outputs the selected value as the final pixel correction value (S1002).

A description is now given of processing for calculating the pixel correction values in S1001 of FIG. 6 with reference to the flowchart of FIG. 7. Although the following describes processing of the pixel correction processing unit 200-1, which calculates the pixel correction value corresponding to the direction of 45°, as a representative of processing of the pixel correction processing units 200-1 to 200-4, the pixel correction values corresponding to the directions of 0°, 90°, and 135° are calculated in a similar manner. The processing of S503 and S504 shown in FIG. 7 is similar to the one explained in First Embodiment, and therefore a description thereof is omitted. The following description is provided under the assumption that the pixel correction value for the defective pixel shown in FIG. 3A is calculated, as in First Embodiment.

(S601)

In accordance with the following Expression 6, the second correction processing unit 201 calculates, as the pixel correction data, an average value of the signal levels of pixels R2 and R6 that are located so as to sandwich the defective pixel 800 along the direction of 45° and have the same color as the defective pixel 800.

$$\text{Pixel correction value corresponding to the direction of } 45° = (R2+R6)/2 \quad \text{[Expression 6]}$$

That is to say, unlike the first correction processing unit 103, the second correction processing unit 201 calculates the pixel correction value without consideration of the ratio calculated by the signal level ratio calculation unit 102.

(S602)

The first weighting coefficient calculation unit 202 acquires the smallest value G_AVE_MIN among the three signal levels G_AVE0, G_AVE1 and G_AVE2 calculated by the signal level ratio calculation unit 102 in accordance with the following Expression 7.

$$G\_AVE\_MIN=\text{smallest value}(G\_AVE0, G\_AVE\_1, G\_AVE2) \quad \text{[Expression 7]}$$

Based on the value of the calculated G_AVE_MIN, the first weighting coefficient calculation unit 202 calculates the weighting coefficient $\alpha 1$ ($0 \leq \alpha 1 \leq 1$) for the pixel correction value that was calculated by the first correction processing unit 103 in S504 and the pixel correction value corresponding to the direction of 45° that was calculated by the second correction processing unit 201 in S601.

Figure 8A:
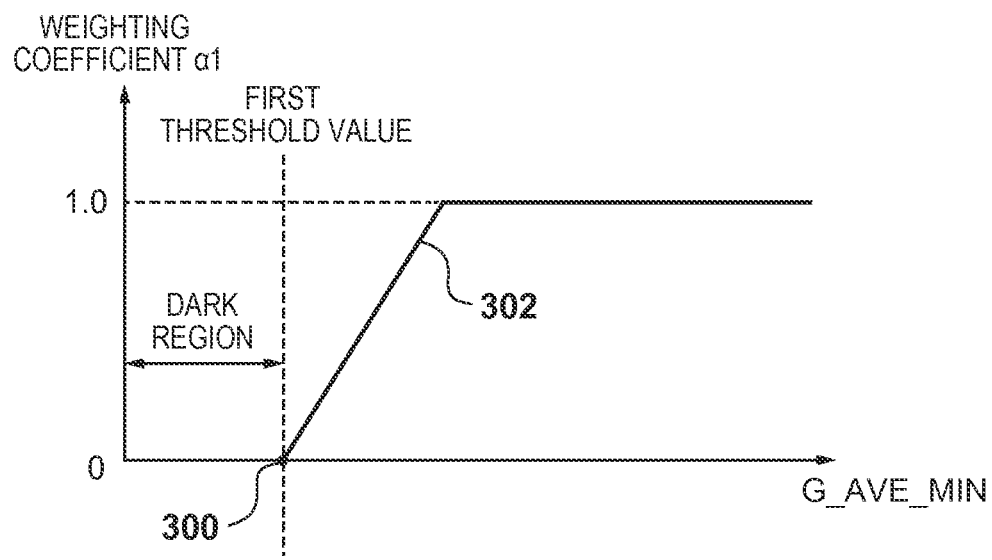
FIG. 8A is a diagram for explaining an example of a weighting coefficient α1 pertaining to Second Embodiment of the present invention.

FIG. 8A shows an example of a relationship between G_AVE_MIN and the weighting coefficient $\alpha 1$. The first weighting coefficient calculation unit 202 can configure a first threshold value 300 at which the weighting coefficient $\alpha 1$ exceeds 0. When G_AVE_MIN is smaller than or equal to the first threshold value, the first weighting coefficient calculation unit 202 considers the G region as a dark region. The first threshold value 300 can be configured in advance in accordance with the properties of the image sensor and the like. In the dark region, a noise level is large relative to a signal level, and therefore the reliability of the ratio calculated by the signal level ratio calculation unit 102 is lowered. For this reason, when G_AVE_MIN is smaller than or equal to the first threshold value 300, the first weighting coefficient calculation unit 202 sets the weighting coefficient $\alpha 1$ to 0.

It is preferable that, when G_AVE_MIN is greater than the first threshold value 300, the first inclination 302 be configured so that the G region is not affected by the dark region. A specific value of the first inclination 302 can be acquired through experimentation and the like.

Although the weighting coefficient $\alpha 1$ is configured in accordance with the smallest value G_AVE_MIN among the average values of the signal levels in the present case, the weighting coefficient $\alpha 1$ may instead be calculated in accordance with the average value (G_AVE0, G_AVE_1, G_AVE2), the largest value (G_AVE0, G_AVE_1, G_AVE2), and the like. Furthermore, the relationship between G_AVE_MIN and the weighting coefficient $\alpha 1$ shown in FIG. 8A may be stored in the first weighting coefficient calculation unit 202 as a table or as a function with G_AVE_MIN serving as an argument.

(S603)

The second weighting coefficient calculation unit 203 extracts the signal levels of:

pixels R2 and R6 that are located so as to sandwich the defective pixel 800 along the direction of 45° and have the same color as the defective pixel 800, pixels G8, G11, G12 and G15 that are adjacent to the defective pixel 800 and have a different color from the defective pixel 800, and pixels G2, G5, G6, G9, G14, G17, G18 and G21 that are adjacent to pixels R2 and R6 and have a different color from the defective pixel 800, the pixels R2 and R6 being adjacent to the defective pixel 800 along the direction of 45° and having the same color as the defective pixel 800.

The second weighting coefficient calculation unit 203 acquires the largest value RG_MAX among the extracted signal levels in accordance with the following Expression 8.

$$RG\_MAX=\text{largest value}(R2, R6, G8, G11, G12, G15, G2, G5, G6, G9, G14, G17, G18, G19) \quad \text{[Expression 8]}$$

Based on the value of the calculated RG_MAX, the second weighting coefficient calculation unit 203 calculates the weighting coefficient $\alpha 2$ ($0 \leq \alpha 2 \leq 1$) for the pixel correction value calculated by the first correction processing unit 103 in S504 and the pixel correction value calculated by the second correction processing unit 201 in S601.

Figure 8B:
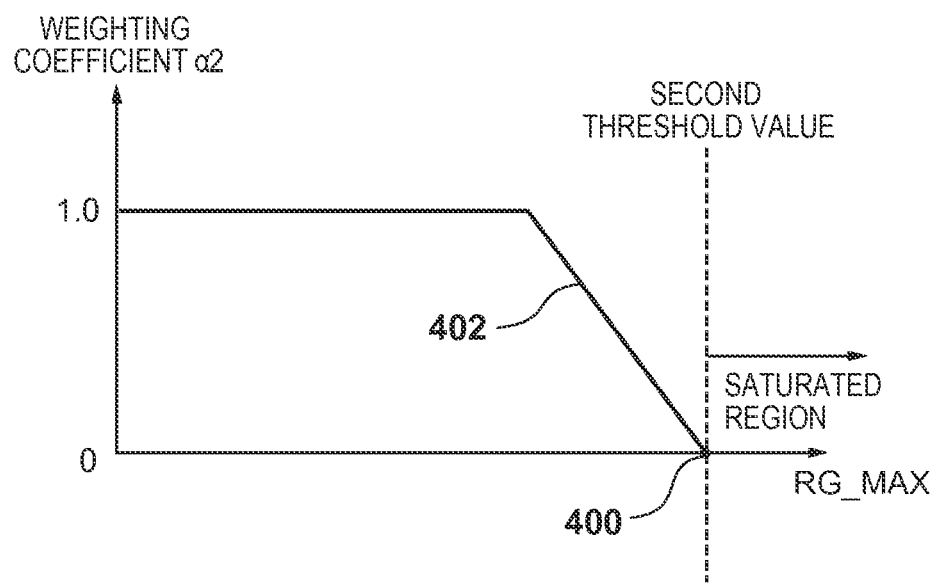
FIG. 8B is a diagram for explaining an example of a weighting coefficient α2 pertaining to Second Embodiment of the present invention.

FIG. 8B shows an example of a relationship between RG_MAX and the weighting coefficient $\alpha 2$. The second weighting coefficient calculation unit 203 can configure a second threshold value 400 at which the weighting coefficient $\alpha 2$ equals 0. When RG_MAX is greater than or equal to the second threshold value, the second weighting coefficient calculation unit 203 considers the G region as a saturated region. The second threshold value 400 can be configured in advance in accordance with the properties of the image sensor and the like. The reliability of the ratio calculated by the signal level ratio calculation unit 102 is lowered in the saturated region as well. For this reason, when G_MAX is greater than or equal to the second threshold value 400, the second weighting coefficient calculation unit 203 sets the weighting coefficient $\alpha 2$ to 0.

Although the weighting coefficient $\alpha 2$ is configured in accordance with the largest value RG_MAX among the signal levels in the present case, the weighting coefficient $\alpha 2$ may instead be calculated in accordance with the average value (R2, R6, G8, G11, G12, G15, G2, G5, G6, G9, G14, G17, G18, G19), the smallest value (R2, R6, G8, G11, G12, G15, G2, G5, G6, G9, G14, G17, G18, G19), and the like. Furthermore, the relationship between RG_MAX and the weighting coefficient $\alpha 2$ shown in FIG. 8B may be stored in the second weighting coefficient calculation unit 203 as a table or as a function with RG_MAX serving as an argument.

It is preferable that, when RG_MAX is smaller than the second threshold value 400, the second inclination 402 be configured so that the G region is not affected by the saturated region. A specific value of the second inclination 402 can be acquired through experimentation and the like.

(S604)

The weighting coefficient selection unit 204 compares the weighting coefficient $\alpha 1$ calculated in S602 with the weighting coefficient $\alpha 2$ calculated in S603, and calculates (selects) the smaller value as the final weighting coefficient $\alpha$ in accordance with the following Expression 9.

Weighting coefficient $\alpha$=smallest value (weighting coefficient $\alpha 1$, weighting coefficient $\alpha 2$) [Expression 9]

In the case where the degree of reliability of the ratio of color signal levels calculated by the signal level ratio calculation unit 102 is low, the above selection of the smaller weighting coefficient reduces the weight for the pixel correction value acquired with consideration of the ratio of the color signal levels, and therefore suppresses the effects of the dark region and the saturated region.

(S605)

The third correction processing unit 205 calculates the final pixel correction value corresponding to the direction of 45° in accordance with the following Expression 10.

Final pixel correction value for defective pixel 800 along direction of 45°=pixel correction value calculated by second correction processing unit 201×(1−$\alpha$)+correction value calculated by first correction processing unit 103×$\alpha$ [Expression 10]

As has been described above, in the present embodiment, the final pixel correction value is acquired by performing weighted addition on the pixel correction value acquired without consideration of the ratio of the color signal levels calculated by the signal level ratio calculation unit 102, and the pixel correction value acquired with consideration of the ratio of the color signal levels calculated by the signal level ratio calculation unit 102. When the degree of reliability of the ratio of the color signal levels calculated by the signal level ratio calculation unit 102 is considered to be low, the weight for the pixel correction value acquired with consideration of the ratio of the color signal levels is reduced. In this way, when the degree of reliability of the ratio of the color signal levels is high, the present embodiment achieves the advantageous effects that are similar to those achieved by First Embodiment, and when the degree of reliability of the ratio of the color signal levels is low, the present embodiment can suppress erroneous correction of the pixel correction value.

In Second Embodiment also, instead of green pixels, blue pixels may be extracted as the pixels that are adjacent to and have a different color from the defective pixel, pixel R2 and pixel R6. The above-described processing is applicable as-is also in the case where the defective pixel is a blue pixel. However, as the green pixels are closer to the red pixels than the blue pixels are to the red pixels, it is thought that the correction accuracy is higher when the green pixels are used as the pixels adjacent to the red pixels than when the blue pixels are used as the pixels adjacent to the red pixels. Furthermore, in the case where the defective pixel is a green pixel, the pixels that are adjacent to the defective pixel and have a different color from the defective pixel are constituted by two blue pixels and two red pixels. In this case, the signal levels of the pixels of both colors may be extracted, or the signal levels of the pixels of one of the two colors may be extracted.

(Other Embodiments)

The above embodiments have described the example in which processing is targeted for image data that has been captured by an image sensor provided with color filters arrayed in accordance with the Bayer arrangement. However, the principle of the present invention can be applied to image data that has been captured by an image sensor provided with color filters where a plurality of certain colors are regularly arranged.

Also, Second Embodiment has described a configuration in which the pixel correction values are generated in correspondence with the directions that can be determined by the direction determination unit 101 (in the case of a color filter with the Bayer arrangement, the directions of 0°, 45°, 90°, and 135°), and one of the pixel correction values is selected based on the direction determined by the direction determination unit 101. Alternatively, it is possible to have a configuration in which a pixel correction value is calculated in correspondence with the direction determined by the direction determination unit 101, as with First Embodiment. In this case, the selection unit 701 is unnecessary, it suffices to have only one of the pixel correction processing units 200-1 to 200-4, and the output from the direction determination unit 101 is supplied to the signal level ratio calculation unit 102, the first correction processing unit 103 and the second correction processing unit 201. Accordingly, the signal level ratio calculation unit 102, the first correction processing unit 103 and the second correction processing unit 201 execute similar processing with respect to the determined direction instead of the aforementioned direction of 45°, and the output from the third correction processing unit 205 serves as the pixel correction value for the defective pixel.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-174252 filed on Aug. 9, 2011 and No. 2012-140037 filed on Jun. 21, 2012, which are hereby incorporated by reference herein their entirety.

The invention claimed is:

1. An image processing apparatus that corrects a signal level of a defective pixel included in image data captured by an image sensor provided with a color filter where a plurality of certain colors are regularly arranged, the image processing apparatus comprising:
a determination unit configured to, based on differences in signal levels of a plurality of pairs of pixels, each pair of pixels being located so as to sandwich the defective pixel and have the same color as the defective pixel, determine a direction being across the defective pixel and along which pixels used to calculate the signal level of the defective pixel are located;
a ratio calculation unit configured to calculate a ratio between signal levels of pixels that are adjacent to the defective pixel and that have a different color from the defective pixel, and signal levels of pixels that are adjacent to pixels being located along the direction determined by the determination unit with respect to the defective pixel and having the same color as the defective pixel and that have a different color from the defective pixel; and
a first correction processing unit configured to output, as the signal level of the defective pixel, a value obtained by multiplying an average value of signal levels of the pixels being located along the direction determined by the determination unit with respect to the defective pixel and having the same color as the defective pixel, by the ratio calculated by the ratio calculation unit.

2. The image processing apparatus according to claim 1, further comprising:
a second correction processing unit configured to output said average value;
a coefficient calculation unit configured to calculate a weighting coefficient from the signal levels of the pixels that are adjacent to the defective pixel and that have a different color from the defective pixel, and from the signal levels of the pixels that are adjacent to the pixels being located along the direction determined by the determination unit with respect to the defective pixel and having the same color as the defective pixel and that have a different color from the defective pixel; and
a third correction processing unit configured to perform, by using the weighting coefficient calculated by the coefficient calculation unit, weighted addition on the value output from the first correction processing unit and the value output from the second correction processing unit, and outputting a result of the weighted addition as the signal level of the defective pixel, wherein
the coefficient calculation unit sets a weighting coefficient used in the weighted addition for the value output from the first correction processing unit to 0 when:
the signal levels of the pixels that are adjacent to the defective pixel and that have a different color from the defective pixel, and the signal levels of the pixels that are adjacent to the pixels being located along the direction determined by the determination unit with respect to the defective pixel and having the same color as the defective pixel and that have a different color from the defective pixel, are within a predetermined dark region or saturated region.

3. The image processing apparatus according to claim 2, wherein
the coefficient calculation unit sets the weighting coefficient used in the weighted addition for the value output from the first correction processing unit to 1 when:
the signal levels of the pixels that are adjacent to the defective pixel and that have a different color from the defective pixel, and the signal levels of the pixels that are adjacent to the pixels being located along the direction determined by the determination unit with respect to the defective pixel and having the same color as the defective pixel and that have a different color from the defective pixel, are not within the predetermined dark region or saturated region.

4. The image processing apparatus according to claim 2, wherein
the coefficient calculation unit sets the weighting coefficient used in the weighted addition for the value output from the first correction processing unit to 0 when:
an average value of the signal levels of the pixels that are adjacent to the defective pixel and that have a different color from the defective pixel, and an average value of the signal levels of the pixels that are adjacent to the pixels being located along the direction determined by the determination unit with respect to the defective pixel and having the same color as the defective pixel and that have a different color from the defective pixel, are smaller than or equal to a predetermined first threshold value, or
the largest value among the signal levels of the pixels that are adjacent to the defective pixel and that have a different color from the defective pixel, and the signal levels of the pixels that are adjacent to the pixels being located along the direction determined by the determination unit with respect to the defective pixel and having the same color as the defective pixel and that have a different color from the defective pixel, is greater than or equal to a predetermined second threshold value.

5. The image processing apparatus according to claim 1, wherein
the determination unit determines the direction based on positions of a pair of pixels whose signal levels have the smallest difference among the plurality of pairs of pixels, each pair of pixels being located so as to sandwich the defective pixel and have the same color as the defective pixel.

6. The image processing apparatus according to claim 1, wherein
the ratio calculation unit
calculates a first average value, which is an average value of the signal levels of the pixels that are adjacent to the defective pixel and that have a different color from the defective pixel,
calculates a second average value and a third average value, each of which is an average value of signal levels of a plurality of pixels that are adjacent to a corresponding one of two pixels being located along the direction determined by the determination unit with respect to the defective pixel and having the same color as the defective pixel, and that have a different color from the defective pixel, and
acquires, as the ratio, a value obtained by the following expression:

the first average value/((the second average value+the third average value)/2).

7. A control method for an image processing apparatus that corrects a signal level of a defective pixel of an image sensor provided with color filters where a plurality of certain colors are regularly arranged, the defective pixel being included in image data captured by the image sensor, the control method comprising:
- a determination step of, based on differences in signal levels of a plurality of pairs of pixels, each pair of pixels being located so as to sandwich the defective pixel and have the same color as the defective pixel, determining a direction being across the defective pixel and along which pixels used to calculate the signal level of the defective pixel are located;
- a ratio calculation step of calculating a ratio between signal levels of pixels that are adjacent to the defective pixel and that have a different color from the defective pixel, and signal levels of pixels that are adjacent to pixels being located along the direction determined in the determination step with respect to the defective pixel and having the same color as the defective pixel and that have a different color from the defective pixel; and
- a first correction processing step of outputting, as the signal level of the defective pixel, a value obtained by multiplying an average value of signal levels of the pixels being located along the direction determined in the determination step with respect to the defective pixel and having the same color as the defective pixel, by the ratio calculated in the ratio calculation step.

8. A non-transitory computer-readable recording medium having recorded thereon a program that causes a computer to function as the image processing apparatus according to claim 1.

* * * * *